(12) United States Patent
Cens et al.

(10) Patent No.: US 7,351,034 B2
(45) Date of Patent: Apr. 1, 2008

(54) IMPELLER DEVICE FOR DATA ACQUISITION IN A FLOW

(75) Inventors: Fabien Cens, Massy (FR); Gilbert Galland, Clamart (FR); Jean-Pierre Chyzak, Eury Gregy sur Yerres (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 89 days.

(21) Appl. No.: 10/521,975

(22) PCT Filed: Jun. 25, 2003

(86) PCT No.: PCT/EP03/50263

§ 371 (c)(1), (2), (4) Date: Jun. 27, 2005

(87) PCT Pub. No.: WO2004/010090

PCT Pub. Date: Jan. 29, 2004

(65) Prior Publication Data

US 2006/0120859 A1 Jun. 8, 2006

(30) Foreign Application Priority Data

Jul. 23, 2002 (FR) .................................. 02 09333

(51) Int. Cl.
*F04D 29/36* (2006.01)
*G01P 5/06* (2006.01)

(52) U.S. Cl. ..................... 416/61; 416/205; 416/244 R; 73/861.85

(58) Field of Classification Search ............ 416/244 R, 416/204 R, 214 R, 246, 174, 61, 197 B, 416/197 R, 205, 206, 207; 415/216.1; 73/1.29, 73/861.85, 152.18, 152.34

See application file for complete search history.

(56) References Cited

U.S. PATENT DOCUMENTS

| 2,316,021 | A | * | 4/1943 | Rippingille | 416/205 |
| 3,598,456 | A | * | 8/1971 | Love | 310/90.5 |
| 4,086,811 | A |   | 5/1978 | Penet |   |
| 6,012,340 | A |   | 1/2000 | Pounder et al. |   |

\* cited by examiner

*Primary Examiner*—Richard A. Edgar
(74) *Attorney, Agent, or Firm*—James L. Kurka; Jaime Castano (57) ABSTRACT

This invention relates to an impeller device for data acquisition in a flow. It comprises a support (3) with two bearing blocks (4.1, 4.2) to hold a spindle (2) around which the impeller (1) is fitted. The spindle (2) comprises two approximately conical ends (5). The bearing blocks (4.1, 4.2) are made from a material with the lowest possible coefficient of friction and each comprises an approximately conical recess (6) into which one of the ends (5) of the spindle (2) fit.

15 Claims, 6 Drawing Sheets

IMPELLER DEVICE FOR DATA ACQUISITION IN A FLOW

TECHNICAL DOMAIN

This invention relates to an impeller device used for data acquisition in a flow.

STATE OF PRIOR ART

It is required to acquire a number of data about the multiphase fluid that flows in a well as precisely as possible, in order to perform maintenance functions, particularly in hydrocarbon production wells. For example, these data may include the nature, the flow and the proportion of the different phases in the fluid. In a hydrocarbon production well, there is usually a three phase fluid formed of oil, gas and water. These fluid phases do not have the same density, they do not move at the same velocity, they are not present in the same proportions and they do not enter the well at the, same location. The distribution of the different fluid phases in the flow is different depending on whether the well is vertical, inclined or horizontal. Due to the difference in density in the different fluid phases, these phases become gradually stratified as the inclination of the well increases. In a particular section of an inclined well, or possibly even a horizontal well, several phases may be present moving at different velocities and in different directions. The different phases in an approximately vertical well mix uniformly.

The required data can be acquired by placing an instrument, for example conform with the instrument described in patent application FR-A1-2 797 295, in the well.

This instrument comprises means of determining the local fluid velocity, in several parts of the well. One of the means is installed in the body of the instrument and other means are installed on a mechanism that can be extended in the form of an arm.

When the instrument is inserted in a horizontal or deviated well, the body rests on the lowest part of the well and the deployed mechanism occupies the entire diameter of the well. Means of determining the velocity are distributed across the entire diameter of the well.

Means of determining the local fluid velocity comprise a small impeller for which the axis of rotation is approximately parallel to the longitudinal axis of the well. The impellers cooperate with contact free sensors that acquire information about their rotation velocity and possibly their rotation direction.

In a well with a small inclination or even a horizontal well, the velocities to be measured may be very low, for example of the order of a few centimeters per second, or they may be much higher, for example several meters per second. Very viscous crude oil may move at these low velocities, whereas water and gas may move at these high velocities.

If the measurements are to be reliable, it is particularly important that the impeller should be sensitive to this entire range of velocities. By comparison, in a vertical well, the velocity of the relatively homogenous mix is of the order of a few tens of centimeters to a few meters per second.

The multiphase fluid is at a temperature of about 150° C., its pressure is about $10^8$ Pa and it may be very corrosive. It may contain compounds containing sulphur, sand or other debris in suspension.

The impeller device must be capable of resisting these difficult conditions.

At the present time, the spindle of the impeller is supported and guided by ball bearings fixed to a support. But the ball bearings cannot resist these severe conditions, and may become seized due to the presence of sand and debris. They can be protected from the fluid by seals. The presence of the seals increases friction between the spindle and the bearings, which is undesirable. This has the disadvantage that it reduces the measurement sensitivity. The minimum velocity at which the impeller starts to rotate is increased.

PRESENTATION OF THE INVENTION

The purpose of this invention is to propose an impeller device that is inexpensive but does not have the disadvantages mentioned above.

To achieve this, the spindle of the impeller and the support have the lowest possible friction and this friction is reproducible from one impeller to another, which enables the different impellers in the same data acquisition instrument to have approximately the same start torque and therefore to start when they are subjected to the same fluid displacement velocity.

More precisely, this invention is an impeller device for data acquisition in a flow, comprising a support to hold a spindle around which the impeller is installed. Two bearing blocks are installed on the support, these bearing blocks are made from a material with the lowest possible coefficient of friction and each being provided with an approximately conical recess in which one of the two ends of the spindle is housed, the ends of the spindle being approximately conical.

With this type of device, it is particularly simple to install the impeller on the support.

Advantageously, the bearing blocks are made based on a material being chosen from among alumina, corundum and diamond.

The two bearing blocks may be fixed with respect to the support, and in this case the impeller spindle is retractable.

In one variant, one of the bearing blocks is fixed and the other is free to move with respect to the support so that the impeller can be installed. This means that the mobile bearing may be moved for installation of the impeller.

The mobile bearing block may be crimped in a base so that it can be moved easily.

The device may include means of forming a predetermined clearance between the bearing blocks and the spindle so as to adjust friction between the spindle and the bearing blocks such that the impeller is hindered as little as possible.

Means of forming the predetermined clearance between the bearing blocks and the spindle may comprise:

a stop to be inserted in the support, means of blocking the stop with respect to the support and, a removable shim, with the thickness corresponding to the clearance.

the shim sliding in the support between the stop and the mobile bearing placed in a position with almost no clearance with the spindle, the shim being removed when the stop, in contact with the shim, is blocked in position with respect to the support, allowing the mobile bearing to occupy another position in which it replaces the shim.

In this configuration, the stop may be made by a sleeve with a longitudinal split and the blocking means may be a screw that expands the split sleeve radially.

In another configuration, the means of forming the clearance between the bearing blocks and the spindle may comprise:

a stop to be inserted in the support, the stop and the mobile bearing block being provided with a dog that controls the clearance, means of blocking the stop with respect to the support when it is pushed in contact with the mobile bearing block placed in a position with almost no clearance from the spindle, without being engaged, means of moving the mobile bearing block into another position in which it is engaged and to hold it in the other position.

The means of moving the mobile bearing block may include a rod fixed to the mobile bearing block that passes through the stop and that is free to move in rotation, and a return spring wound around the rod, supported at one end on the stop and at the other side fixed to the rod.

The support may be in the form of a stirrup.

Advantageously, it may be made of Inconel.

The device may comprise an impeller rotation velocity sensor, housed in the support and placed in the spindle of the impeller.

This invention also relates to an assembly process for an impeller on a support for data acquisition in a flow. It comprises the following steps:

fixing a fixed bearing block on the support, positioning of a mobile bearing block on the support, in a first position, the mobile bearing block being sufficiently far from the fixed bearing block so that the spindle of the impeller can be placed between them, the bearing blocks each comprising an approximately conical recess, placement of the impeller spindle, this spindle having approximately conical ends, and each will fit into a recess, positioning of the mobile bearing block in a second position, in contact with the spindle with almost no clearance, solidarisation of one stop with respect to the support, this stop being required to cooperate with the mobile bearing block, its position taking account of a predetermined clearance to be formed between the mobile bearing block and the spindle, displacement of the mobile bearing block to a third position which moves the fixed bearing away by the predetermined clearance and brings it into contact with the stop.

A step may also be included to insert a shim determining the clearance, in the support, between the mobile bearing and the stop before the solidarisation step, and another step may be included to remove the shim after the solidarisation step and before the displacement step.

In one variant, the mobile bearing displacement step may include a step to engage the mobile bearing with the stop, the dog determining the clearance.

This invention also relates to a device for data acquisition in a flow, particularly in a hydrocarbon well, this instrument comprising at least one impeller device thus characterized.

BRIEF DESCRIPTION OF THE DRAWINGS

This invention will be better understood after reading the description of example embodiments given for information purposes only and in no way limitative, with reference to the attached drawings in which.

Identical, similar or equivalent parts in the different figures described below have the same numeric references to facilitate the passage from one figure to the next.

The various parts shown in the figures are not necessarily shown at the same scale, to make the figures more legible.

DETAILED PRESENTATION OF PARTICULAR EMBODIMENTS

Figure 1:
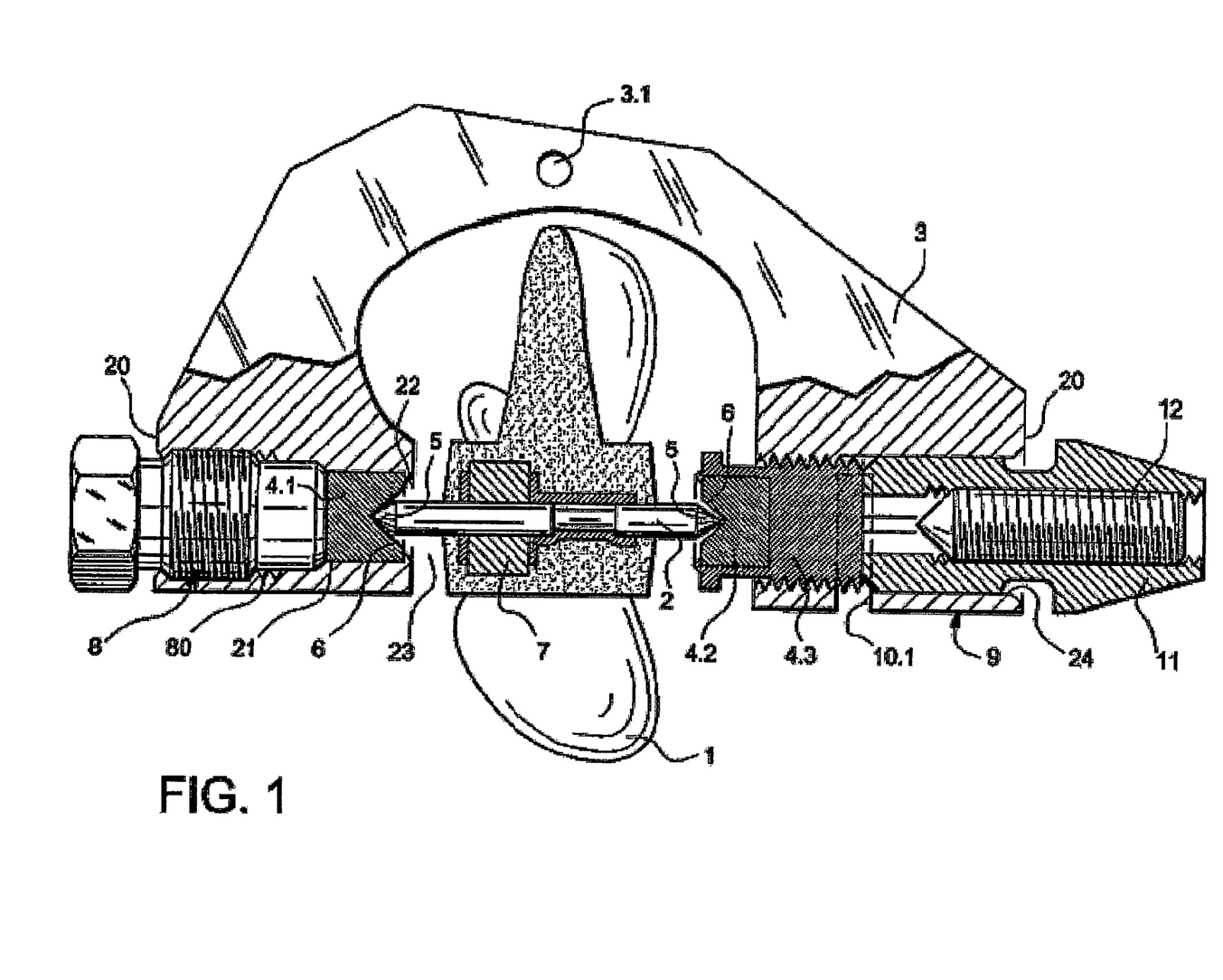
FIG. 1 shows a sectional view of an example of an impeller device according to the invention.

Refer to FIG. 1. FIG. 1 shows details of a first embodiment of the impeller device according to the invention.

The impeller is marked as reference 1 and its spindle is marked as reference 2. The support on which the impeller 1 will be installed is marked as reference 3. Two bearing blocks 4.1, 4.2 supporting the spindle 2 of the impeller 1 are fixed to the support 3.

The spindle 2 of the impeller 1 has two ends 5 that are approximately conical. The bearing blocks 4.1, 4.2 each have an approximately conical recess 6 in which one end 5 of the spindle 2 of the impeller 1 will fit. The spindle 2 of the impeller 1 may for example be made of tungsten carbide to resist corrosion.

Bearing blocks 4.1 and 4.2 are made from a material with the lowest possible coefficient of friction, for example a precious stone may be used, preferably synthetic, such as diamond, sapphire or corundum. Uncrystallized alumina is also suitable. These materials are very hard and resist the severe environment in a hydrocarbon well.

The approximately conical shape of the recesses 6 in bearing blocks 4.1 and 4.2 make the impeller device 1 almost insensitive to the presence of sand or other debris in the fluid in the well. Sand grains or debris do not get trapped between the end of the spindle and the bearing block, they are eliminated during rotation of the impeller. The impeller 1 is not hindered in rotation. This is an essential point for reliability of the impeller device.

This approximately conical shape for the recesses 6 and the ends 5 minimizes friction between the spindle 2 and the bearing blocks 4.1 and 4.2. Due to the low friction of the bearing block-spindle assembly, the impeller device is sensitive to extremely low fluid velocities, for example of the order of five centimeters per second or less. Its friction torque when starting is as low as possible.

Obviously, this performance is related particularly to the inertia of the impeller 1. This inertia is reduced by making the impeller 1 from a strong and light weight material. For example, a polyethercetone type thermoplastic resin can be used. This resin is known under the name VICTREX PEEK 450 GL 30 which is a registered trademark of I.C.I. (IMPERIAL CHEMICAL INDUSTRIES). The advantage of this material is that it can be injection moulded. The impeller 1 may be insert moulded around its spindle 2 and at least one magnet 7 that will excite a magnetic movement sensor 8 that will acquire information about the velocity of the impeller 1 and that is placed close to it. This sensor 8 is fixed to the support 3. This type of impeller is described in French patent application in the name of the applicant and deposited on the same day as this application.

Figure 5:
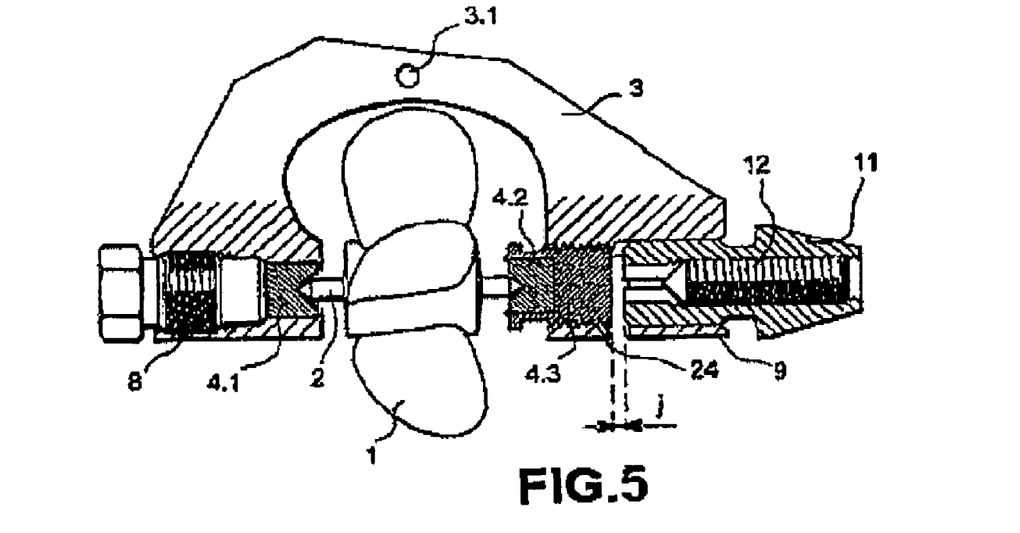

The support 3 of the impeller is in the shape of a stirrup with two ends 20. Its profile is aerodynamic to minimize disturbance to the fluid flow in the well. It may be made of metal, for example INCONEL® (registered trademark of the INCO Limited Company) which is an alloy made of nickel, chromium and molybdenum. In its medium part, it comprises an orifice 3.1 that can be attached to a data acquisition instrument like that shown in FIG. 5.

The impeller 1 is installed in the space 23 between the two ends 20, and the spindle 2 joins the two ends 20. Each of the ends 20 is equipped with one of the bearing blocks 4.1 and 4.2.

The impeller device in FIG. 1 is equipped with means 9 of forming a predetermined clearance between the spindle 2 and the bearing blocks 4.1, 4.2. These means 9 make it possible to introduce a clearance that can be reproduced from one impeller to another. Thus, in a data acquisition instrument with several impeller devices, all the impellers will begin their rotation at the same fluid velocity and the measurements obtained from these impellers will be consistent. Forces exerted by the bearing blocks on the spindle will be the same in different impeller devices.

We will now describe an operating method to be followed to install the impeller 1 on the support 3. We will begin by installing the two bearing blocks 4.1, 4.2 on the support 3.

One of the bearing blocks 4.1 is installed fixed on the support 3. It is subsequently referred to as the fixed bearing block. It is inserted in a hole 21 drilled in the support 3 located at one of its ends 20. This hole 21 terminates with a shoulder 22 on the side of the space 23.

Figure 2:
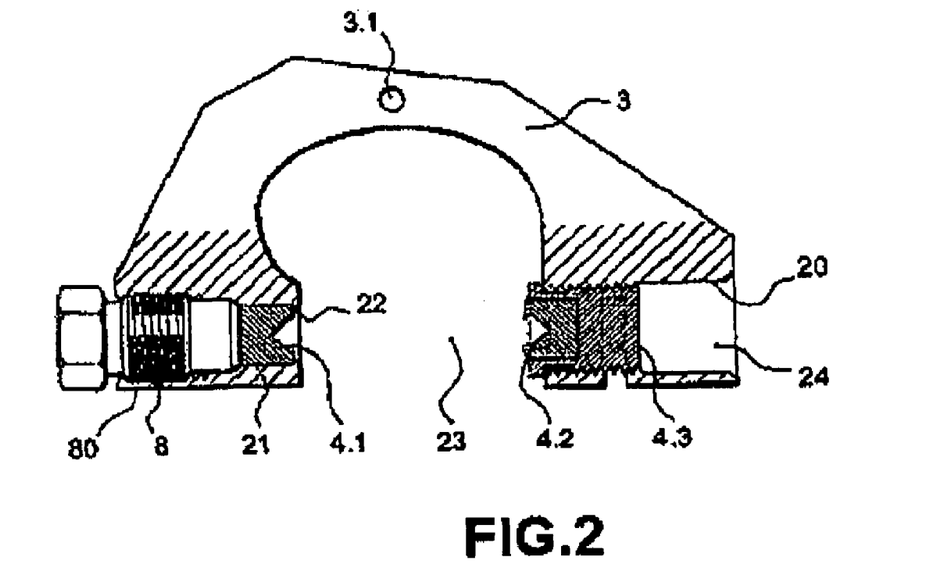
FIGS. 2 to 5 illustrate steps in the assembly of the impeller in the impeller device according to FIG. 1.

The fixed bearing block 4.1 stops in contact with shoulder 22 of the support 3. It is held in this position by the chamber 80 in which the sensor 8 is located (FIG. 2). The chamber 80 is screwed into the hole 21 that is threaded. The velocity sensor 8 is then located along the spindle of the impeller 1.

The other bearing block 4.2 may move with respect to the support 3 during assembly of the impeller. It is subsequently referred to as the mobile bearing block. It is crimped on a base 4.3 that is threaded on the outside. This base 4.3 is screwed into a hole 24 with a drilling at the other end 20 of the support 3, screwing being done from space 23.

When the mobile bearing block 4.2 is installed, it is placed sufficiently remote from the fixed bearing block 4.1 such that the spindle 2 of the impeller 1 can be inserted between the two bearing blocks 4.1 and 4.2. This is done by screwing its base 4.3 into the hole 24 so that it penetrates sufficiently into the hole 24 (FIG. 2).

Figure 3:
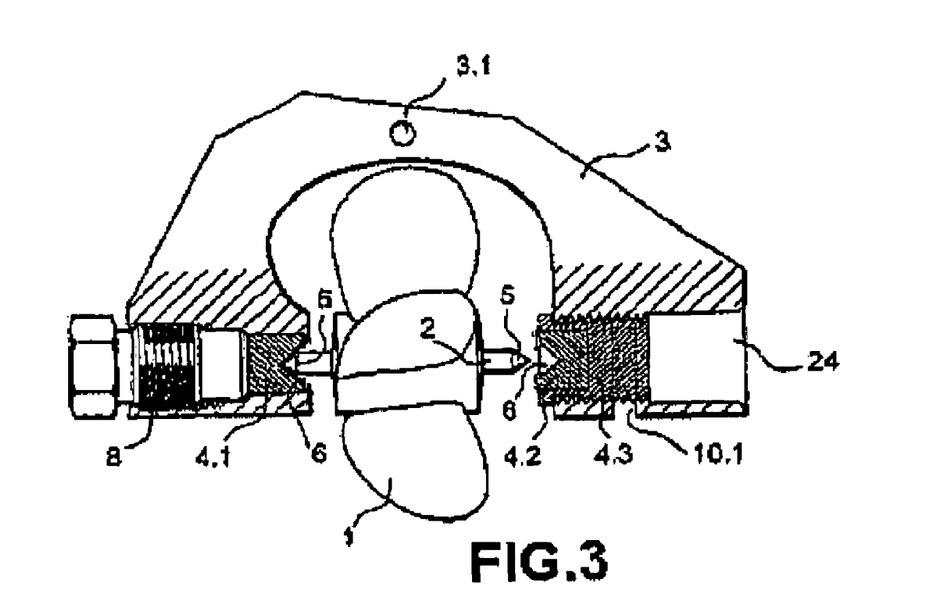

The spindle 2 of the impeller 1 is inserted between the two bearing blocks 4.1 and 4.2. The ends 5 of the spindle 2 penetrate into the recesses 6 that are approximately conical (FIG. 3).

By varying the mobile bearing block 4.2, the two bearing blocks 4.1, 4.2 are then brought closer together until there is an approximately zero clearance between the spindle 2 and the bearing blocks 4.1, 4.2. This is done by unscrewing the base 4.3. of the mobile bearing block 4.2. It is put in a second position. A shim 10 is inserted in a slit 10.1 that is provided in the support 3. The shim 10 passes through the hole 24 in which the mobile bearing 4.2 will fit. Its thickness is equal to the required clearance j between the spindle 2 and the bearing blocks 4.1, 4.2.

Figure 4:
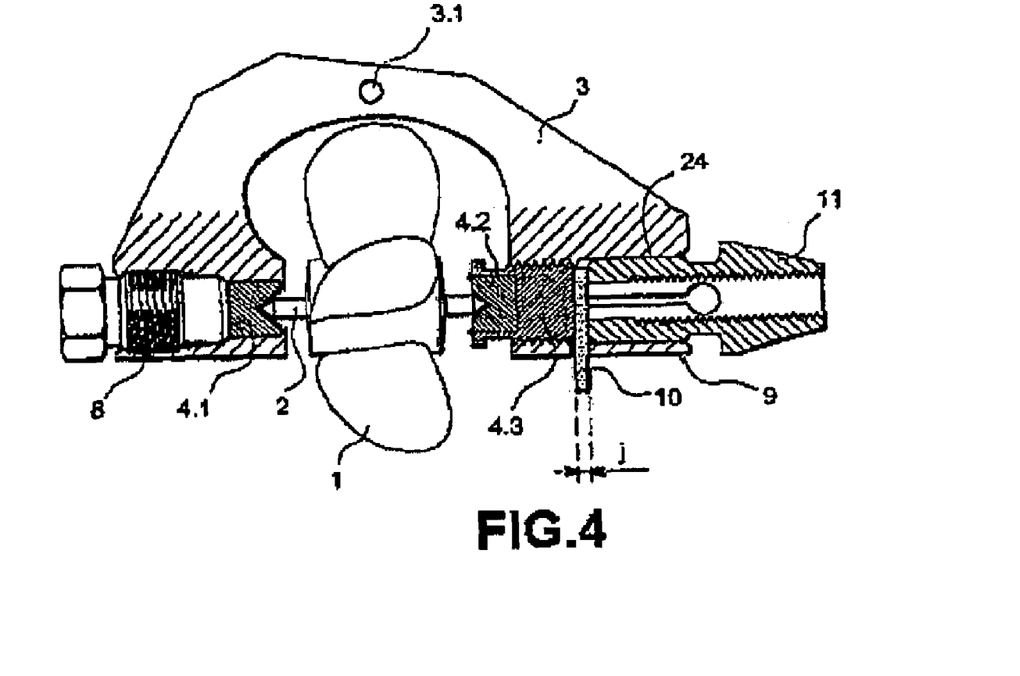

A stop 11 is then inserted in the hole 24 of the mobile bearing block 4.2 such that the shim 10 is trapped between the mobile bearing 4.2 and the stop 11 (FIG. 4).

In this position, the stop 11 is blocked with respect to the support 3 using blocking means 12. For example, the stop 11 may be in the form of an expandable sleeve, in other words a hollow tubular part in which one portion is provided with at least one longitudinal slit. The blocking means 12 will expand the sleeve 11 radially. For example, they may be in the form of a blocking screw 12 that is screwed inside the sleeve 11. As the screw is screwed in, the sleeve expands radially in the same way as an insert.

The shim 10 (FIG. 5) is removed and the mobile bearing block 4.2 is moved backwards until it comes into contact in stop on the expandable sleeve 11 (FIG. 1) in a third position. It takes the place of the shim 10. The mobile bearing block 4.2 is then blocked.

The clearance j between the spindle 2 and the bearing blocks 4.1, 4.2 is then perfectly controlled since it is equal to the thickness of the shim 10.

Disassembly of the impeller 1, its adjustment in position and its disassembly are particularly simple. The assembly is achieved by removing the sleeve. Maintenance is facilitated.

Figure 6:
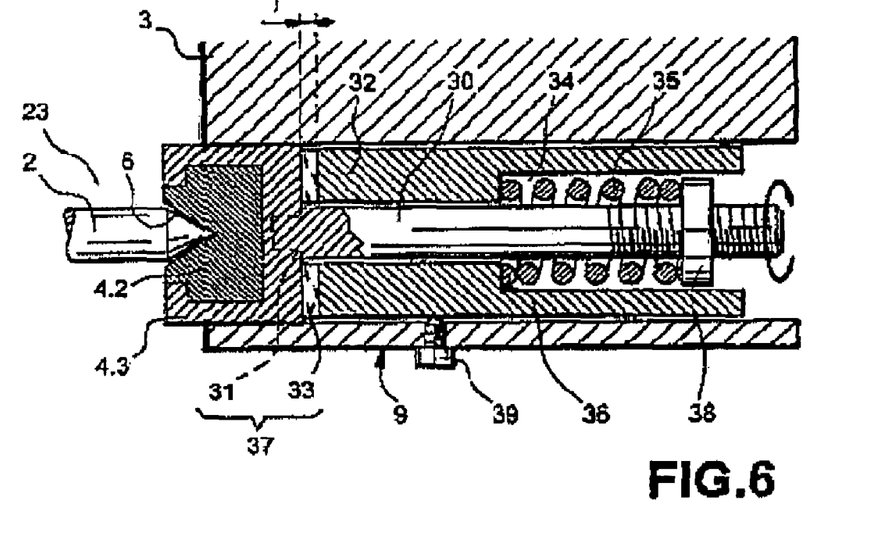
FIGS. 6 and 7 illustrate steps in the assembly of the impeller in another example of an impeller device according to the invention.
Figure 7:
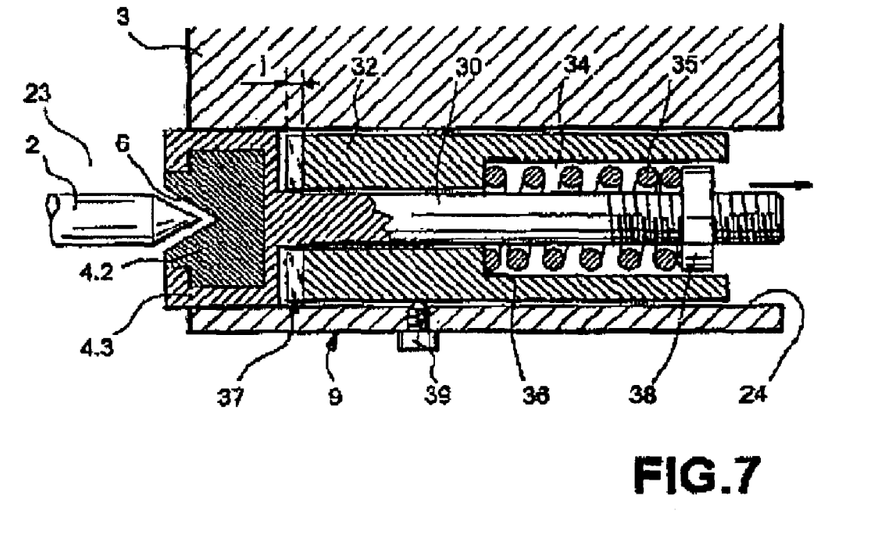

FIGS. 6 and 7 show a variant of the means used to form a predetermined clearance between the spindle 2 and the bearing blocks 4.1 and 4.2.

Compared with FIG. 1, there is no change in the assembly of the fixed bearing block 4.1. Therefore it is not shown.

The mobile bearing block 4.2 is always crimped in a base 4.3, but the base 4.3 is now smooth, it is not threaded and it is prolonged by a rod 30. The means 9 of forming the clearance j between the bearing blocks 4.1, 4.2 and the spindle 2 comprise a stop 32 that will be slid on the rod 30, the mobile bearing block 4.2 and the stop 32 being fitted with a dog 37 with a first relief 31 on the mobile bearing block 4.2, at the face of the base 4.3 from which the rod 30 projects, and a second relief 33 with the matching shape of the first relief 31 supported on stop 32. The dimensions of the dog 37 control the clearance j.

FIGS. 6 and 7 show the first relief 31 of the dog 37 in the form of two diametrically opposite grooves on each side of the rod 30 and the second relief 33 of the dog 37 in the form of two diametrically opposite mouldings. The reverse will be possible, the grooves could be on the stop and the mouldings could be on the base.

The stop 32 in the form of a sleeve delimits the other side of the second relief 33, a housing 34 for return means 35 with the mobile bearing block 4.2, this housing 34 being provided with a bottom 36. The return means 34 are in the form of a spring in compression between firstly the bottom 36 of the housing 34 and secondly the rod 30. It may be fixed directly to the rod 30 or it may be in contact with a ring 38 fixed to the rod. The ring 38 may be made by a nut.

The assembly thus described is inserted free to move in the hole 24 of the support 3, the spindle 2 of the impeller is inserted in the space 23, the mobile bearing block 4.2 is brought close to the fixed bearing block (not shown) and is pushed into contact with spindle 2 with almost no clearance. The relief 31 and the relief 33 of the dog 37 do not coincide. The stop 32 is held in position with respect to the support 3 both in translation and in rotation using a blocking means 39, for example a needle screw type (FIG. 6).

The rod 30 moves the mobile bearing block 4.2 to engage it. This is done by turning it until the first relief and the second relief 31, 33 of the dog 37 coincide. The mobile bearing block 4.2 moves backwards because the stop 32 is held in a fixed position with respect to the support 3. The movement of the mobile bearing block 4.2 is approximately equal to the depth of the relief in the dog 37, in other words the clearance j. The spring 34 applies a restraining force on the mobile bearing block 4.2 so as to hold it in the engaged position.

This configuration could be more expensive to make than the first configuration, since it requires more parts and particularly a spring.

Instead of providing one mobile bearing block and one fixed bearing block, it would be possible for both bearing blocks to be fixed.

Figure 8:
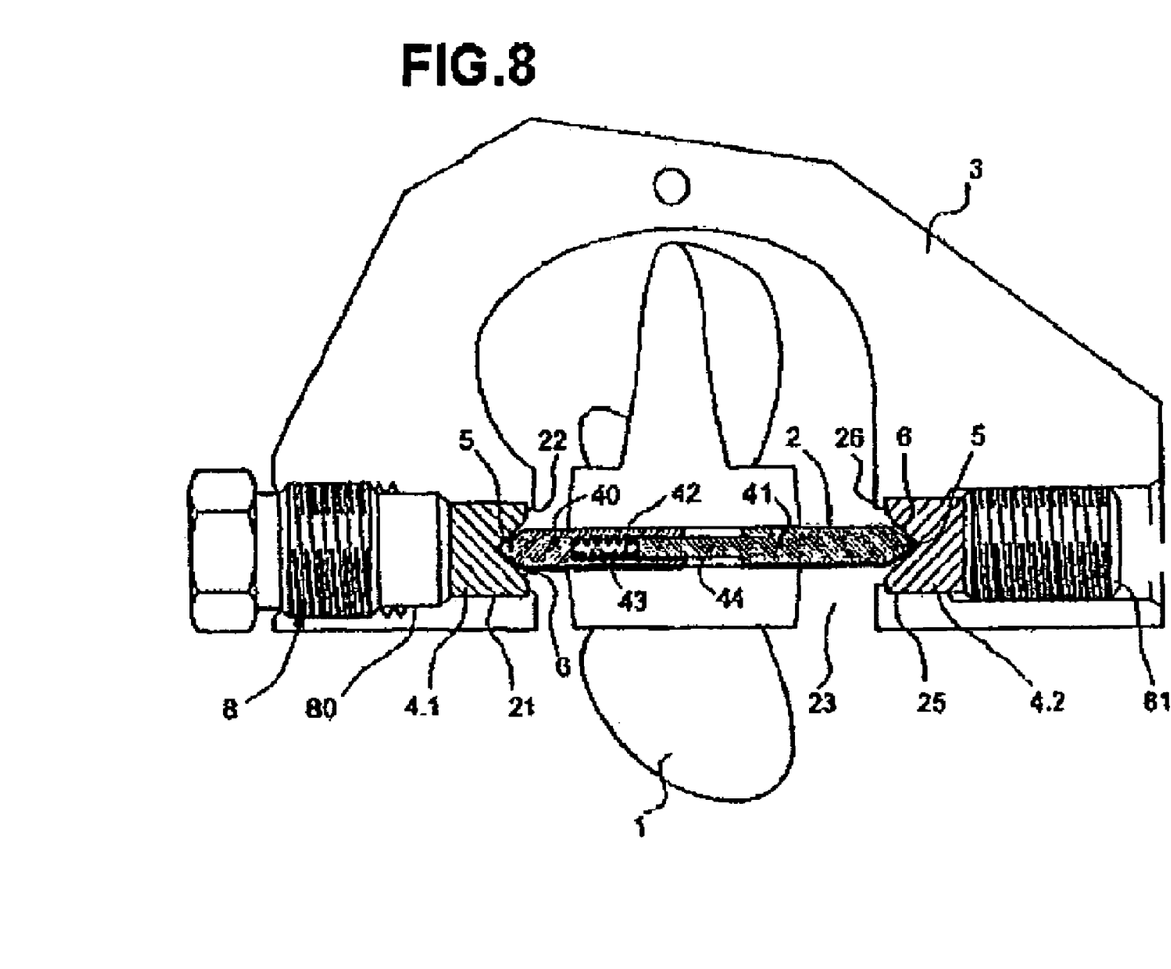
FIG. 8 shows a section through another example of an impeller device according to the invention.

FIG. 8 shows such a configuration.

The two bearing blocks 4.1, 4.2 may be installed like the fixed bearing block in FIG. 1. Each of them 4.1, 4.2 is inserted in a hole 21, 25 of the support 3 provided with a shoulder 22, 26 at the side of the space 23, and which stops in contact with the shoulder 22, 26. It is held in position by a part 80, 81 screwed into the hole 21, 25 until it comes into contact with the shoulder 22, 26. The spindle 2 of the impeller 1 is now retractable, instead of having a constant length. It comprises two elongated parts 40, 41.

The first part 40 is provided with a housing 42 for a spring 43. The other part 41 comprises a portion 44 that will be inserted into the housing 42 and will slide in housing 42 in contact with the spring 43.

When the spindle 2 is pressed in, it can be inserted between the two fixed bearing blocks 4.1, 4.2, and it then expands slightly when the ends 5 of the spindle 2 enter into the approximately conical recesses 6 in the bearing blocks 4.1. and 4.2. The spring is chosen to minimize friction in the bearing blocks-spindle assembly.

Figure 9:
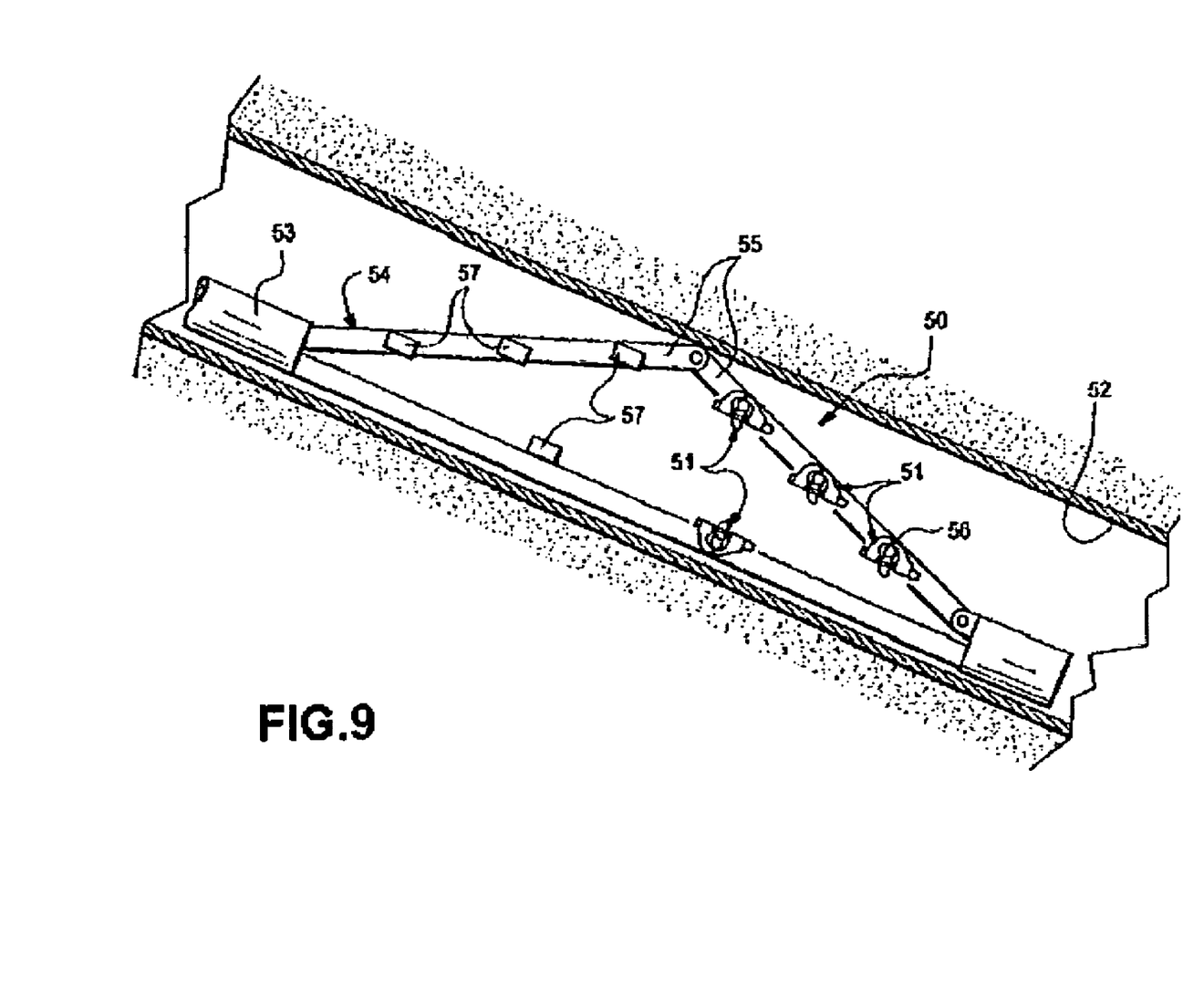
FIG. 9 shows a data acquisition instrument placed in a hydrocarbon well equipped with several impeller devices according to the invention.

FIG. 9 diagrammatically shows an example of a data acquisition instrument 50 of the type presented in patent application FR-A 2 797 295. It comprises at least one impeller device 51 like that described above. The instrument 50 is lowered into an inclined or even approximately horizontal hydrocarbon well 52. The instrument 50 is connected to the surface by a rod or a cable not shown. The data acquired in the instrument 50 are transmitted to the surface by the cable, the rod or by telemetry. The instrument 50 comprises an approximately cylindrical body 53 with a diameter less than the diameter of the well 52. The body 53 is fixed to a deployable mechanism 54. The deployable mechanism 54 comprises two arms 55 articulated with each other and with the body 53. The body 53 is supported on the lower wall of the well 52. During deployment, the arms 55 are in shape of a V located in a vertical plane passing through the longitudinal axis of the well 52. The impeller devices 51 are distributed approximately uniformly along one of the arms 55. They are fixed to the arm for example using a split pin 56 that passes through the orifice 3.1 of the support 3. The other arm may be equipped with electrical and/or optical sensors 57 also distributed approximately uniformly along the arm. An impeller device 51 and/or at least one sensor 57 may be placed on the body 53.

This type of impeller device 51 can easily be removed from the instrument 50. Maintenance in the device itself is easy, and the impeller may easily be changed.

Although several embodiments of this invention have been represented and described in detail, it can easily be understood that various changes and modifications can be made without going outside of the scope of the invention, particularly for the support.

Data acquisition in a hydrocarbon well has been used as an example application, but obviously this impeller device could be used in other domains, for example in a submarine environment or even in a borehole other than an oil well.

The invention claimed is:

1. Impeller device for data acquisition in a flow, comprising a support (3) to hold a spindle (2) around which the impeller (1) is fitted, two bearing blocks (4.1, 4.2) mounted on the support (3), these bearing blocks (4.1, 4.2) being made from a material chosen from among alumina, corundum, diamond and sapphire, wherein:

each of the bearing blocks comprises an approximately conical recess (6) into which one of the ends (5) of the spindle (2) fits, the ends of the spindle (2) being approximately conical;

the two bearing blocks (4.1, 4.2) are fixed with respect to the support (3), and the spindle (2) of the impeller (1) is retractable.

2. Device according to claim 1, wherein one (4.1) of the bearing blocks is fixed and the other (4.2) is free to move, with respect to the support (3).

3. Device according to claim 2, wherein the mobile bearing block (4.2) is crimped in a base (4.3).

4. Device according to claim 2, wherein the device comprises means (9) of forming a predetermined clearance (j) between the bearing blocks (4.1, 4.2) and the spindle (2).

5. Device according to claim 4, wherein the means (9) of forming the predetermined clearance (j) between the bearing blocks (4.1, 4.2) and the spindle (2) comprise:

a. a stop (11) to be inserted in the support (3),
b. means of blocking (12) the stop (11) with respect to the support (3) and,
c. a removable shim (10), the thickness of which corresponds to the clearance (j), the shim (10) being slid into the support (3) between the stop (11) and the mobile bearing (4.2) placed in a position with almost no clearance with the spindle (2), the shim (10) being removed when the stop (11), forced into contact with the shim (10) is blocked with respect to the support (3), allowing the mobile bearing block (4.2) to occupy another position in which it replaces the shim (10).

6. Device according to claim 5, wherein the stop (11) is a sleeve with a longitudinal slit and the blocking means (12) are a screw that expands the split sleeve radially.

7. Device according to claim 4, wherein the means of forming the clearance (j) between the bearing blocks (4.1, 4.2) and the spindle (2) comprise:

d. a stop (32) to be inserted in the support (3), the stop (32) and the mobile bearing block (4.2) being provided with a dog (37) that controls the clearance (j),
e. means (39) of blocking the stop (32) with respect to the support (3) when it is forced into contact with the mobile bearing block (4.2) placed in an approximately clearance free position with the spindle (2), without being engaged,
f. means (30, 35) of displacing the mobile bearing block (4.2) in another position in which it is engaged and to hold it in the other position.

8. Device according to claim 7, wherein the means for displacing the mobile bearing block (4.2) comprise a rod fixed (30) on the mobile bearing block (4.2) that passes through the stop (32) and that is free to move in rotation and a return spring (35) around the rod (30), pressing on the stop (32) at one end and fixed to the rod (30) at the other end.

9. Device according to claim 1, wherein the support (3) is in the form of a stirrup.

10. Device according to claim 9, wherein the support (3) is made of INCONEL®.

11. Device according to claim 1, wherein the device comprises a rotation velocity sensor (8) for the impeller (1) housed in the support (3) and placed in the spindle of the impeller (1).

12. Data acquisition instrument in a flow, comprising at least one device according to claim 1.

13. Process for installation of an impeller (1) on a support (3) for data acquisition in a flow, comprising the following steps:

g. fixing a fixed bearing block (4.1) on the support (3),
h. positioning a mobile bearing block (4.2) in a first position on the support (3), the mobile bearing block (4.2) being sufficiently far from the fixed bearing block (4.1) to put the spindle (2) of the impeller (1) between them, the bearing blocks (4.1. 4.2) each comprising an approximately conical recess (6),
i. placement of the spindle (2) of the impeller (1), this spindle (2) being provided with approximately conical end pieces (5), each of them fitting in a recess (6),
j. positioning of the mobile bearing block (4.2) in a second position, in a clearance free stop in contact with the spindle (2),
k. solidarisation of a stop (11, 32) with respect to the support (3), this stop (11, 32) will cooperate with the mobile bearing block (4.2), its position taking account of a predetermined clearance (j) to be formed between the mobile bearing block (4.2) and the spindle (2),
l. displacement of the mobile bearing block (4.2) to a third position that moves it away from the fixed bearing block (4.1) by the predetermined clearance (j) and which brings it into contact with the stop (11, 32).

14. Process according to claim 13, wherein the process comprises a step to insert a shim (10) determining the clearance (j) in the support (3) between the mobile bearing block (4.2) and the stop (11) before the solidarisation step and a step to remove the shim (10) after the solidarisation step but before the displacement step.

15. Process according to claim 13, characterized in that the displacement step of the mobile bearing block (4.2) includes a step in which the mobile bearing block (4.2) is engaged with the stop (32), a dog (37) determining the clearance.

* * * * *